(12) United States Patent
Abernathy et al.

(10) Patent No.: US 7,350,056 B2
(45) Date of Patent: Mar. 25, 2008

(54) METHOD AND APPARATUS FOR ISSUING INSTRUCTIONS FROM AN ISSUE QUEUE IN AN INFORMATION HANDLING SYSTEM

(75) Inventors: Christopher Michael Abernathy, Austin, TX (US); Jonathan James DeMent, Austin, TX (US); Kurt Alan Feiste, Austin, TX (US); David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 11/236,838

(22) Filed: Sep. 27, 2005

(65) Prior Publication Data

US 2007/0074005 A1  Mar. 29, 2007

(51) Int. Cl.
*G06F 9/30* (2006.01)

(52) U.S. Cl. .................... 712/216; 712/214

(58) Field of Classification Search ............ 712/214, 712/216, 217, 219
See application file for complete search history.

(56) References Cited

U.S. PATENT DOCUMENTS

| | | | | |
|---|---|---|---|---|
| 3,810,118 A * | 5/1974 | Kiffmeyer .................. 700/1 |
| 4,056,847 A | 11/1977 | Marcantonio et al. |
| 4,799,154 A | 1/1989 | Matthews et al. |
| 4,837,678 A * | 6/1989 | Culler et al. ............... 712/204 |
| 5,651,125 A | 7/1997 | Witt et al. |
| 5,745,726 A * | 4/1998 | Shebanow et al. .......... 712/216 |
| 5,941,983 A * | 8/1999 | Gupta et al. ............... 712/214 |
| 5,944,811 A * | 8/1999 | Motomura ................. 712/23 |
| 5,958,043 A * | 9/1999 | Motomura ................. 712/216 |
| 6,112,019 A * | 8/2000 | Chamdani et al. .......... 712/214 |
| 6,289,437 B1 | 9/2001 | Eisen et al. |
| 6,351,802 B1* | 2/2002 | Sheaffer .................... 712/215 |
| 6,453,407 B1* | 9/2002 | Lavi et al. ................. 712/24 |
| 6,484,253 B1 | 11/2002 | Matsuo et al. |
| 6,587,914 B2* | 7/2003 | Campardo ................. 711/103 |
| 6,654,869 B1* | 11/2003 | Kahle et al. ............... 712/24 |
| 6,658,551 B1 | 12/2003 | Berenbaum et al. |

(Continued)

OTHER PUBLICATIONS

Genua, "A Cache Primer", Oct. 2004, Freescale Semiconductor.

(Continued)

*Primary Examiner*—Aimee J. Li
(74) *Attorney, Agent, or Firm*—D'Ann Rifai; Mark P Kahler

(57) ABSTRACT

An information handling system includes a processor that issues instructions out of program order. The processor includes an issue queue that may advance instructions toward issue even though some instructions in the queue are not ready-to-issue. The issue queue includes a matrix of storage cells configured in rows and columns including a first row that couples to execution units. Instructions advance toward issuance from row to row as unoccupied storage cells appear. Unoccupied cells appear when instructions advance toward the first row and upon issuance. When a particular row includes an instruction that is not ready-to-issue a stall condition occurs for that instruction. However, to prevent the entire issue queue and processor from stalling, a ready-to-issue instruction in another row may bypass the row including the stalled or not-ready-to-issue instruction. Out-of-order issuance of instructions to the execution units thus continues.

17 Claims, 11 Drawing Sheets

U.S. PATENT DOCUMENTS

| | | | | |
|---|---|---|---|---|
| 6,691,221 | B2* | 2/2004 | Joshi et al. | 712/215 |
| 6,693,814 | B2 | 2/2004 | McKenzie et al. | |
| 6,704,856 | B1* | 3/2004 | Farrell et al. | 712/215 |
| 6,725,354 | B1* | 4/2004 | Kahle et al. | 712/34 |
| 7,028,164 | B2* | 4/2006 | Jarvis et al. | 712/206 |
| 2002/0007434 | A1* | 1/2002 | Campardo | 711/103 |
| 2002/0087832 | A1* | 7/2002 | Jarvis et al. | 712/206 |
| 2003/0120898 | A1* | 6/2003 | Fischer et al. | 712/205 |
| 2004/0148493 | A1* | 7/2004 | Chu et al. | 712/214 |
| 2005/0038979 | A1* | 2/2005 | Fischer et al. | 712/214 |

OTHER PUBLICATIONS

Hartstein, et al., The Optimum Pipeline Depth for a Microprocessor, ISCA 2002.

Jones et al., "Software Directed Issue Queue Power Reduction", HPCA 2005.

Nelson, "Priority Queues and the STL", Dr. Dobb's Journal, Jan. 1996.

Wikipedia, "Out Of Order Execution",downloaded from wikipedia.org on Jul. 1, 2005.

Rapaka et al., "A Mixed-Clock Issue Queue Design . . . ", ACM, 2003.

Srinivasan, et al., "Formal Verification of an Intel XScale Processor Model . . . " MEMCODE'03, Jun. 2003.

Koppanalil, et al., "A Case for Dynamic Pipeline Scaling", ACM, 2002.

Tan, et al., "A Prioritized Cache for Multi-Tasking Real-Time Systems", downloaded from ece.gatech.edu on Jul. 2, 2005.

* cited by examiner

PRIORITY STATE MACHINE (INSTRUCTION AGE)

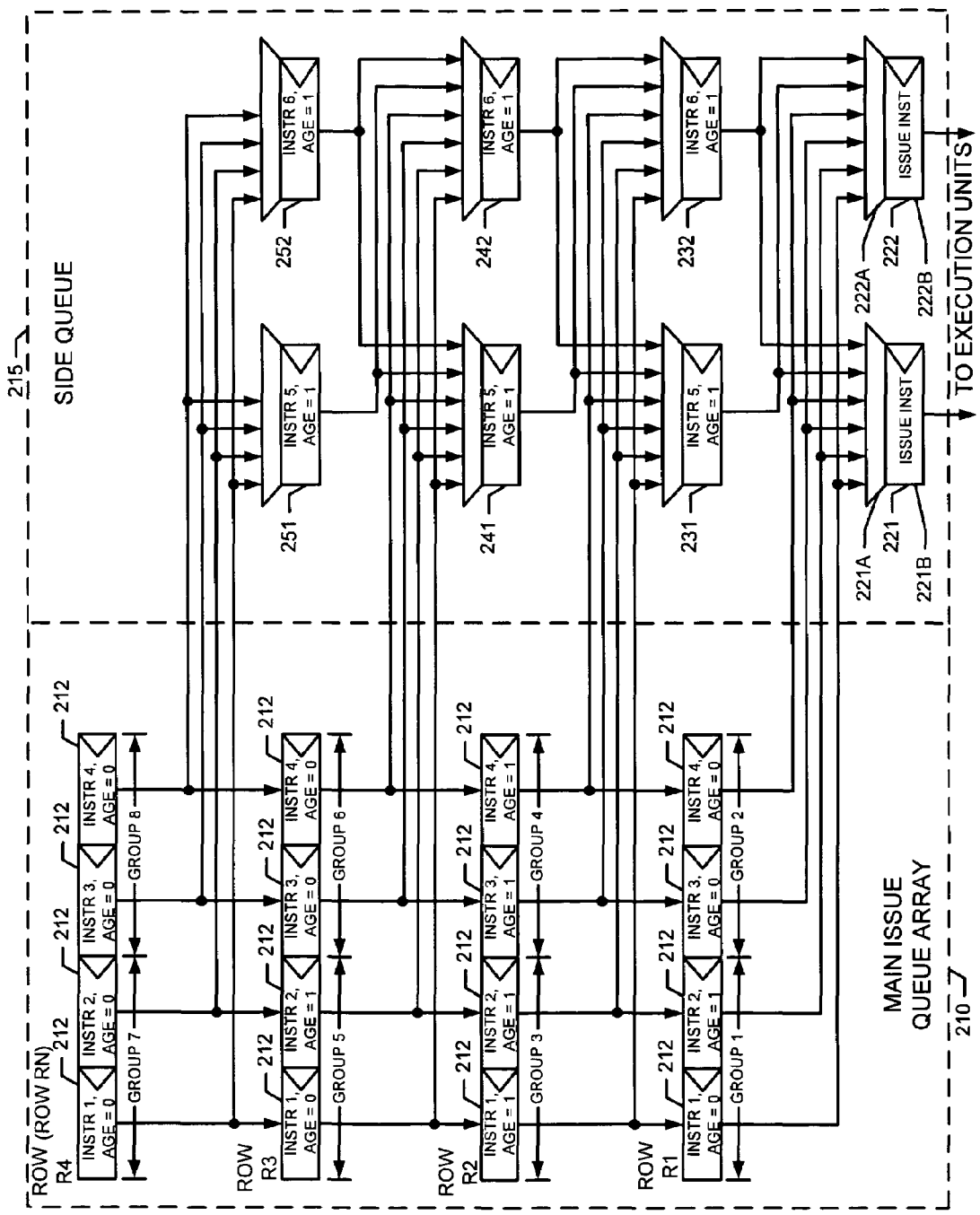

METHOD AND APPARATUS FOR ISSUING INSTRUCTIONS FROM AN ISSUE QUEUE IN AN INFORMATION HANDLING SYSTEM

CROSS REFERENCE TO RELATED PATENT APPLICATIONS

This patent application is related to the U.S. patent application entitled "Method And Apparatus For Issuing Instructions From An Issue Queue Including A Main Issue Queue Array And An Auxiliary Issue Queue Array In An Information Handling System", inventors Abernathy, et al., Ser. No. 11/236,835, filed Sep. 27, 2005 and assigned to the same assignee, the disclosure of which is incorporated herein by reference in its entirety.

TECHNICAL FIELD OF THE INVENTION

The disclosures herein relate to information handling systems, and more particularly, to issuing instructions in a processor of an information handling system.

BACKGROUND

A conventional processor in an information handling system may include several pipeline stages to increase the effective throughput of the processor. For example, the processor may include a fetch stage that fetches instructions from memory, a decoder stage that decodes instructions into opcodes and operands, and an execution stage with various execution units that execute decoded instructions. Pipelining enables the processor to obtain greater efficiency by performing these processor operations in parallel. For example, the decoder stage may decode a fetched instruction while the fetch stage fetches the next instruction. Similarly, an execution unit in the execution stage may execute a decoded instruction while the decoder stage decodes another instruction.

The simplest processors processed instructions in program order, namely the order that the processor encounters instructions in a program. Processor designers increased processor efficiency by designing processors that execute instructions out-of-order (OOO). Designers found that a processor can process instructions out of program order provided the processed instruction does not depend on a result not yet available, such as a result from an earlier instruction. In other words, a processor can execute an instruction out-of-order (OOO) provided that instruction does not exhibit a dependency.

To enable a processor to execute instructions out-of-order (OOO), the processor may include an issue queue between the decoder stage and the execution stage. The issue queue acts as a buffer that effectively decouples the decoder stage from the execution units that form the execution stage of the processor. The issue queue includes logic that determines which instructions to send to the various execution units and the order those instructions are sent to the execution units.

The issue queue of a processor may stall when the queue encounters one or more instructions that exhibit a dependency on other instructions. In other words, the issue queue waits for the processor to resolve these dependencies. Once the processor resolves the dependencies, the issue queue may continue issuing instructions to the execution units and execution continues. Unfortunately, the processor loses valuable time when the issue queue exhibits a stall until the processor resolves the dependencies causing the stall. Some modern processors may allow multiple instructions to stall; however, they generally do not scale to high frequency operation or scale to large issue queues.

What is needed is a method and apparatus that addresses the processor inefficiency problem described above in a scalable manner.

SUMMARY

Accordingly, in one embodiment, a method is disclosed for operating a a processor wherein an instruction fetcher fetches instructions from a memory, thus providing fetched instructions. The method also includes decoding the fetched instructions, by a decoder, to provide decoded instructions to an issue queue. The method further includes storing, by the issue queue, the decoded instructions in a matrix of storage cell rows and columns for out-of-order issuance to an execution unit. The method still further includes determining, by the issue queue, if the issue queue is stalled by a first instruction that is not ready-to-issue in one of the rows of the issue queue. The issue queue searches other rows of the issue queue to locate a second instruction that is ready-to-issue. In one embodiment, the method also includes bypassing the first instruction by the issue queue forwarding the second instruction to an execution unit while the first instruction remains in the issue queue.

In another embodiment, a processor is disclosed that includes a fetch stage adapted to fetch instructions from a memory to provide fetched instructions. The processor also includes a decoder, coupled to the fetch stage, that decodes the fetched instructions. The processor further includes a plurality of execution units. The processor still further includes an issue queue coupled between the decoder and the plurality of execution units. The issue queue includes a matrix of storage cell rows and columns that store decoded instructions for out-of-order issuance to the plurality of execution units. The issue queue determines if a stall exists caused by a first instruction that is not-ready-to issue in one of the rows. In that event, the issue queue searches deeper into other rows of the issue queue to locate a second instruction that is ready-to-issue. In one embodiment, the issue queue is configured such that the second instruction bypasses the first instruction by forwarding the second instruction to an execution unit while the first instruction remains in the issue queue.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 4B is a block diagram of the issue queue including age control information.

DETAILED DESCRIPTION

Figure 1:
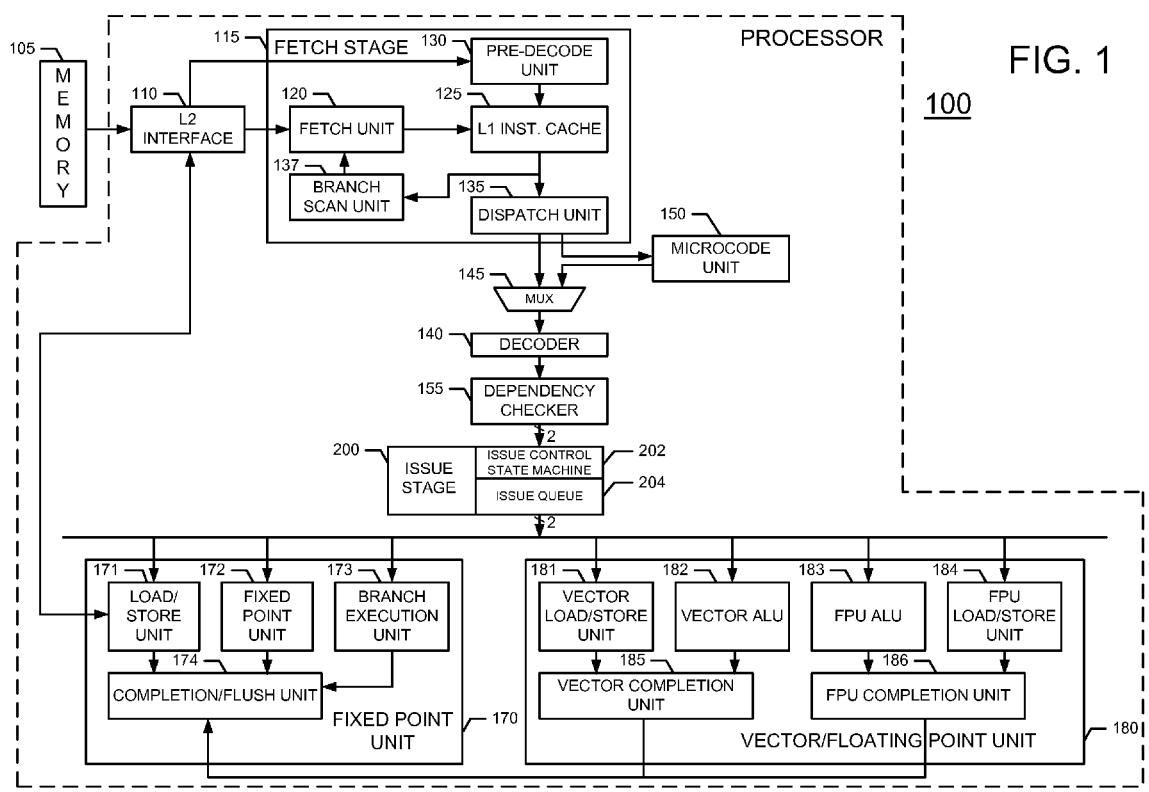
FIG. 1 shows a block diagram of one embodiment of the disclosed processor.

The disclosed processor fetches instructions from a memory store and decodes those instructions. Decoded instructions fall into two categories, namely instructions "ready-to-issue" and instructions "not ready-to-issue". Reasons why a particular instruction may not be ready-to-issue include: 1) the instruction exhibits a dependency, namely the instruction requires a result of a previously issued instruction before executing, 2) the instruction is a "context synchronizing instruction", namely, the instruction must wait for all previous instructions to finish execution, 3) a "pipeline busy" condition exists, namely the instruction must wait because the processor previously executed a non-pipelined instruction, and 4) a resource busy condition exists, namely the instruction requires an unavailable resource such as a load or store queue in the execution unit that is full.

The issue queue holds decoded instructions not yet ready-to-issue to an execution unit. When instructions stall in the issue queue while waiting for dependencies to resolve, or for other reasons, queue logic takes advantage of this time to search deeper in the issue queue to locate any non-dependent instructions that may issue out-of-order (OOO). In this manner, useful processor activity continues while stalled instructions wait for dependency resolution or wait for the resolution of other reasons preventing issuance.

The issue queue of the processor includes an array of instruction storage locations arranged in rows and columns. The issue queue includes a row R1, a row R2, . . . RN wherein N is the depth of the issue queue. The issue queue issues instructions to appropriate execution units for execution. The output of the issue queue includes an issue point from which a ready-to-issue instruction issues to an execution unit capable of executing the function prescribed by the instruction. If row R1 includes an instruction that is not ready-to-issue, such as an instruction exhibiting a dependency, then row R1 can not advance past the issue point. This condition stalls row R1 of the issue queue. However, when the issue queue stalls in this manner, issue queue logic can search deeper into row R (1+1), namely row R2, for a non-dependent instruction that may issue. If the issue queue logic finds such a non-dependent instruction in row R2, then the non-dependent instruction bypasses the stalled row R1 in front of the non dependent instruction. In this manner, the processor can perform useful work while older dependent instructions stall.

In one embodiment, the processor repeats the above described structure recursively from row R1, R2 . . . RN, where N represents the depth of the issue queue. In other words, the processor recursively configures the rows with respect to one another. If row RN includes an instruction that includes no dependencies, i.e. an instruction that is ready-to-issue, issue queue logic advances that instruction to the preceding row R(N−1). In this manner, that instruction may advance from row to row toward row R as further stalls occur leading to a deeper search of the issue queue. When the advancing instruction reaches row R1, the issue queue logic causes the instruction to issue to the appropriate execution unit.

FIG. 1 shows a block diagram of a processor 100 coupled to a memory 105. Processor 100 includes an L2 interface 110 that couples to memory 105 to receive instructions and data therefrom. Memory 105 stores instructions organized in program order. A fetch stage 115 couples to L2 interface 110 to enable processor 100 to fetch instructions from memory 105. More particularly, fetch stage 115 includes a fetch unit 120 that couples to L2 interface 110 and an L1 instruction cache 125. A pre-decode unit 130 couples L2 interface 110 to L1 instruction cache 125 to pre-decode instructions passing through fetch unit 120 from memory 105. L1 instruction cache 125 couples to pre-decode unit 130 and dispatch unit 135 as shown. A branch scan unit 137 couples between L1 instruction cache 125 and fetch unit 120 as shown.

Dispatch unit 135 couples to decoder 140 directly via multiplexer (MUX) 145 or alternatively through microcode unit 150 and MUX 145 as shown. In this manner, dispatch unit 135 transmits instructions that require no breakdown into smaller instructions through MUX 145 to decoder 140. Alternatively, dispatched instructions that exhibit a size requiring breakdown into smaller instructions pass through microcode unit 150. Microcode unit 150 breaks these instructions into smaller instructions which MUX 145 transmits to decoder 140 for decoding.

Decoder 140 decodes the instructions provided thereto by fetch stage 115. Decoder 140 couples to a dependency checker 155 that checks each decoded instruction to determine if the decoded instruction exhibits a dependency on an instruction subsequent to the decoded instruction or a operand or result not currently available. Dependency checker 155 couples to an issue stage 200 that includes an issue control state machine 202 and an issue queue 204. Issue stage 200 passes each decoded instruction it receives to an appropriate execution unit within fixed point unit 170 and/or vector/floating point unit 180. Issue stage 200 efficiently determines those instructions ready-to-issue and speedily issues those instructions to appropriate execution units.

Fixed point unit 170 includes load/store execution unit 171, fixed point execution unit 172, branch execution unit 173 and completion/flush unit 174 all coupled together as shown in FIG. 1. Vector/floating point unit 180 includes a vector load/store unit 181, a vector arithmetic logic unit (ALU) 182, a floating point unit (FPU) arithmetic logic unit (ALU) 183, an FPU load/store unit 184, a vector completion unit 185 and an FPU completion unit 186 all coupled together as shown in FIG. 1. Vector completion unit 185 and FPU completion unit 186 of vector/floating point unit 180 couple to completion/flush unit 174 of fixed point unit 170. Completion units 174,185 and 186 perform tasks such as retiring instructions in order and handling exception conditions that may arise in the associated execution units.

Figure 2:
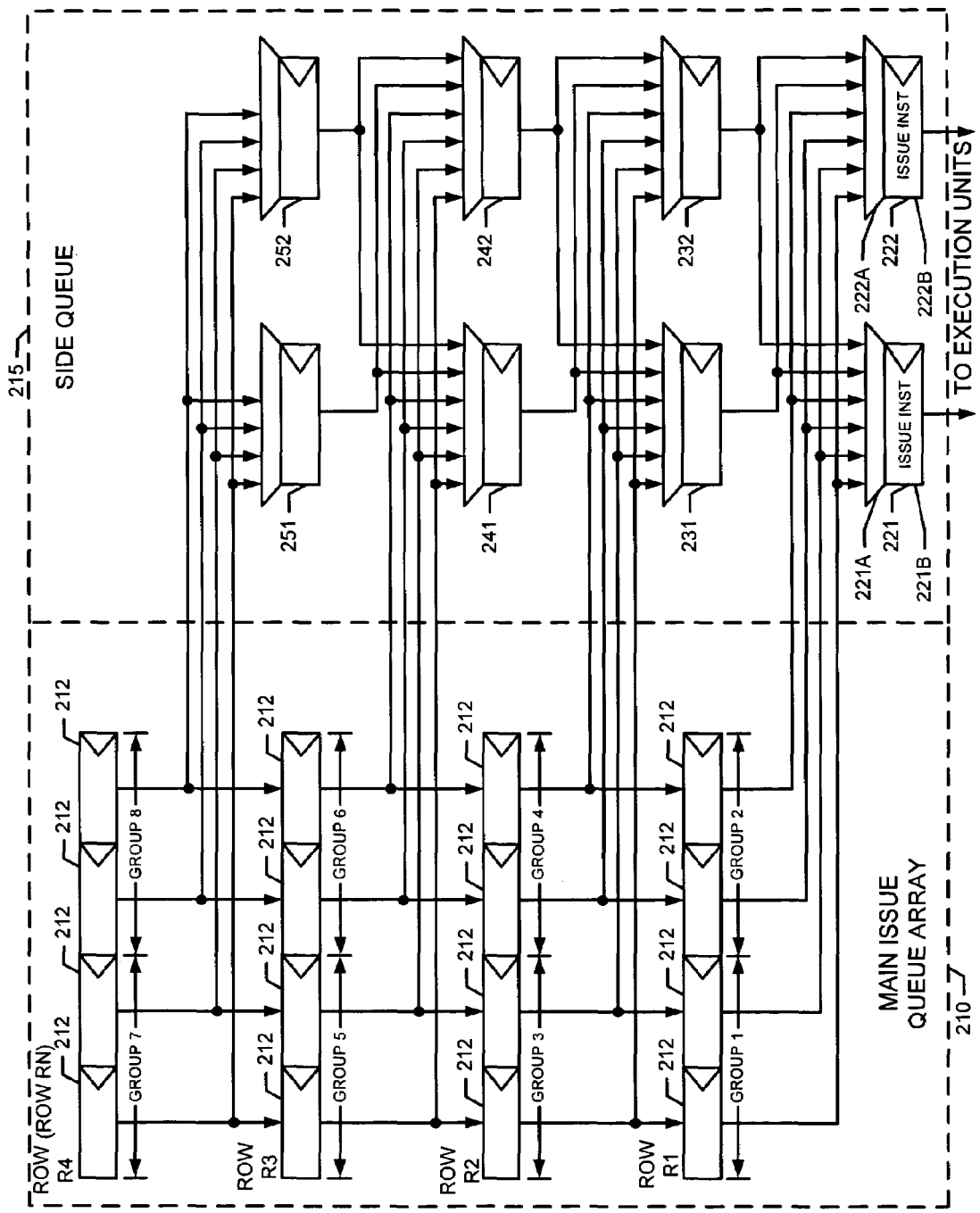
FIG. 2 shows a block diagram of the issue queue of the processor of FIG. 1.

Decoder 140 dispatches decoded instructions to appropriate execution units via issue queue 204. Issue queue 204 issues queued instructions to appropriate execution units when dependencies resolve for such instructions as discussed in more detail below. Issue queue 204 includes a main issue queue array 210 of storage cells or latches 212 arranged in rows and columns as shown in FIG. 2. Each latch 212 stores an instruction provided by decoder 140. More particularly, main issue queue array 210 includes rows R1, R2 . . . RN wherein N is the total number of rows in main issue queue array 210. In this particular example, N=4 such that the main issue queue array includes 4 rows. Also in this particular example, main issue queue array 210 includes 4 columns. Main issue queue array 210 may employ a greater or lesser number of rows and columns than shown depending upon the particular application.

In this particular embodiment, when fully populated with instructions, main issue queue array 210 may store 16 instructions, namely 4 instructions per each of the 4 rows. Main issue queue array 210 groups these instructions into 8 groups, each of which includes 2 instructions. Thus, when fully populated, main issue queue array 210 includes 8 groups of 2 instructions each, namely instruction groups 1 and 2 in row R1, instruction groups 3 and 4 in row R2, instruction groups 5 and 6 in row R3, and instruction groups 7 and 8 in row R4.

Issue queue 204 also includes an auxiliary queue or side queue 215 that provides an alternative path to the execution units. In this particular embodiment, side queue 215 includes two storage cells per row of main issue queue array 210. The row R1 storage cells, corresponding to the group 1 and group 2 instructions, couple to both side queue storage units 221 and 222. Side queue storage units 221 and 222 form an issue row from which instructions issue to the execution units. Each side queue storage unit includes both a multiplexer and a storage cell as shown in FIG. 2. For example, side queue storage unit 221 includes a MUX 221A coupled to a latch or storage cell 221B. FIG. 2 shows MUX 221A joined together with storage cell 221B for convenience of illustration. Side queue storage unit 222 includes a MUX 222A coupled to a latch or storage cell 222B. Once instructions transfer to storage cell 221B and 222B, these instructions issue to appropriate execution units for execution.

In this particular embodiment wherein side queue 215 includes two storage cells per row of main issue queue array 210, side queue 215 may issue two instructions per processor clock cycle. Thus, assuming that row R1 of main issue queue array 210 includes 4 valid instructions total in group 1 and group 2, two of those four instructions may move to side queue storage cells 221 and 222, respectively, provided the instructions meet certain criteria discussed below.

Side queue 215 also includes side queue storage cells 231 and 232 coupled to the storage cells 212 of row R2 as shown. Side queue storage cells 231 and 232 together form a row within side queue 215. Side queue 215 further includes side queue storage cells 241 and 242 coupled to the storage cells 212 of row R3. Side queue storage cells 241 and 242 together form another row within side queue 215. Side queue 215 still further includes side queue storage cells 251 and 252 coupled to the storage cells 212 of row R4. Side queue storage cells 251 and 252 together form yet another row within side queue 215. When one of storage cells 212 in rows R1, R2, R3 or R4 stores an instruction, then issue queue 204 regards that cell as storing a valid entry. However, if a cell does not store an instruction, then issue queue 204 regards such an unoccupied cell as exhibiting an invalid entry.

Figure 3:
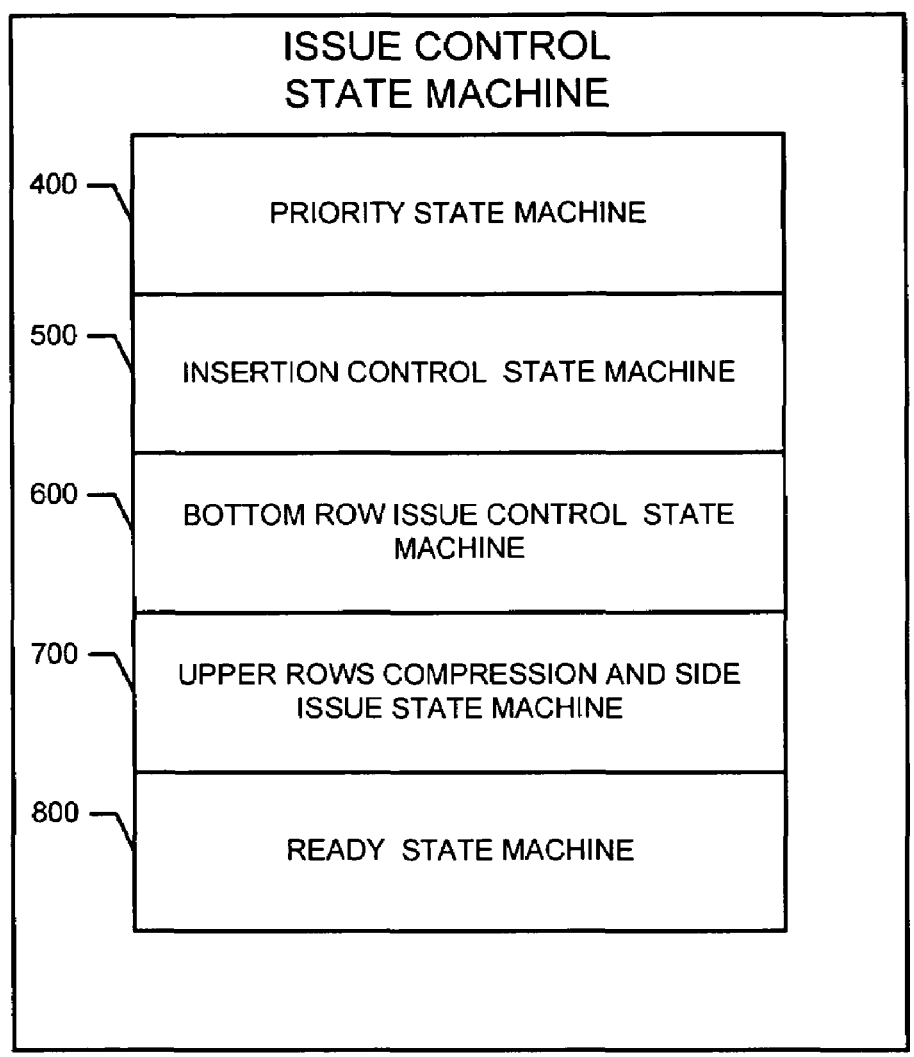
FIG. 3 shows a block diagram an issue control state machine in the disclosed processor.

The issue control state machine 202 shown in FIG. 1 and FIG. 3 may store instructions received from decoder 140 into any storage cell of rows R1 to R4 that are available. When processor 100 initializes, all storage cells of main issue queue array 210 are empty. Similarly, all storage cells of side queue 215 are empty when processor 100 initializes. When processor operation commences, issue control state machine 202 populates the highest priority storage cells 212 in array 210 first. In one embodiment, processor 100 defines the bottom row, namely row R1, as the highest priority row of the array 210, that row being closest to issue. This means that instructions stored in the storage cells of row R1 are closer to issue than other rows of main issue queue array 210. Row R2 exhibits the next highest priority after row R1. Row R3 then exhibits the next highest priority after row R2 and so forth upward in the array. Higher priority means that instructions in row R1 are closer to issue than instructions in rows R2 and above as explained in more detail below. By convention, in each row of main issue queue array 210, instructions closer to the left end of each row of the main issue queue array exhibit a higher priority than instructions further to the right in each row. An alternative embodiment is possible wherein this convention is reversed.

Instructions stored as group 1 or group 2 in row R1 may issue to an execution unit via side queue storage unit 221 or side queue storage unit 222. Execution units couple to the outputs of side queue storage units 221 and 222 as shown in FIG. 2. In one processor cycle, issue control state machine 202 may instruct multiplexer 221A to select any of the group 1 and group 2 instructions stored in row R1 and store the selected instruction in storage cell 221B. In the same processor cycle, issue control state machine 202 may also instruct multiplexer 222A to select any of the group 1 and group 2 instructions not already selected in row R1 and store the selected instruction in storage cell 222B. Side queue 215 selects and stores two instructions from row R1 in this manner. In one embodiment, side queue 215 selects instructions from the same group. For example, group 1 provides two instructions or group 2 provides two instructions for storage in storage cells 221B or 222B. Other embodiments are possible wherein side queue 215 selects one instruction from group 1 and one instruction from group 2 for storage in storage cells 221B and 222B. In a subsequent processor cycle, the instructions stored in side queue storage unit 221 and side queue storage unit 222 issue to appropriate execution units.

In a similar manner, issue control state machine 202 may instruct side queue storage units 231 and 232 to store instructions from group 3 and group 4 in row R2. Issue control state machine 202 may also instruct side queue storage units 241 and 242 to store instructions from group 5 and group 6 in row R3. Issue control state machine 202 may further instruct side queue storage units 251 and 252 to store instructions from group 7 and group 8 in row R4. Main issue queue array 210 and side queue 215 can scale to include additional rows by following the connection pattern of FIG. 2 as a template. More particularly, main issue queue array 210 and side issue queue 215 exhibit a recursive topology, since row R2 and the associated side queue storage units 231-232 repeat and follow the connection pattern of row R1 and the associated side queue storage units 221-222 below. Similarly, row R3 and the associated side queue storage units 241-242 exhibit a recursive topology with respect to the rows below, and so forth for row R4 and higher rows(not shown). In one embodiment, issue control state machine 202 transfers ready-to-issue instructions to side queue 215.

The output of side queue storage unit 231 couples to respective inputs of side queue storage units 221 and 222. The output of side queue storage unit 232 couples to respective inputs of side queue storage units 221 and 222. Thus, instructions stored in side queue storage unit 231 and 232 may proceed to issue to appropriate execution units via side queue storage units 221 and 222.

The output of side queue storage unit 241 couples to respective inputs of side queue storage units 231 and 232. The output of side queue storage unit 242 couples to respective inputs of side queue storage units 231 and 232. Thus, instructions stored in side queue storage units 241 and 242 may proceed to issue to appropriate execution units via the side queue storage units 231 and 232 associated with row R2 and via the side queue storage units 221 and 222 associated with row R1.

Finally, the output of side queue storage unit 251 couples to respective inputs of side queue storage units 241 and 242. The output of side queue storage unit 252 couples to respective inputs of side queue storage units 241 and 242. Thus, instructions stored in side queue storage unit 251 and 252 may proceed to issue to appropriate execution units via the side queue storage units 241 and 242 associated with row R3, the side queue storage units 231 and 232 associated with row R2 and via the side queue storage units 221 and 222 associated with row R1. Ready-to-issue instructions can progress toward execution through side queue one row of the side queue per processor cycle, as explained in more detail below.

Instructions may take two paths through issue queue 204 to reach the execution units coupled thereto. Main issue queue array 210 provides one path for instructions to progress through issue queue 204, while side queue 215 provides another path through issue queue 204. In practice, instructions may pass through portions of main issue queue array 210 and portions of side queue 215 before issuing to an appropriate execution unit for execution. It is possible that a particular row in main issue queue array 210 may fill with instructions that can not issue due to dependencies or other reasons. Such a row becomes a stall point in that it may prevent instructions in rows above the stalled row from progressing to lower rows and issuing to the execution units. When a row exhibits such a stall point, the row above the stalled row may bypass the stalled row by transferring its instructions to side queue 215, as directed by issue control state machine 202. Once in the side queue 215, the transferred instructions progress from row to row, lower and lower in the side queue in subsequent processor cycles until they issue to the execution units coupled to the lowermost side queue storage units 221 and 222.

A series of examples below explains the operation of issue queue 204 under different operating conditions. In one example, issue control state machine 202 inserts 2 valid instructions in group 1 of row R1 during one processor cycle. These instructions are ready-to-issue. In other words, these instructions exhibit no reason why they cannot issue immediately to the execution units. A reason that may prevent immediate execution of an instruction in an out-of-order (OOO) issue queue is that the instruction exhibits dependencies on the results of other instructions. In other words, needed operands required by the instruction are not presently available. However, since in the present example, group 1 of row 1 includes two valid instructions with no dependencies, row 1 supplies these two ready-to-issue instructions to storage cells 221 and 222, respectively, of side queue 215 from which these instructions may issue to the execution units coupled thereto. In the next processor cycle after issue control state machine 202 inserts the 2 valid instructions with no dependencies in group 1 of row 1, state machine 202 inserts 2 valid instructions with no dependencies in group 2 of row 1. In the next processor cycle, main issue queue array 210 transfers the two instructions in group 2 of row 1 to storage cells 221 and 222 for execution since no reasons exists for delaying execution. In the same processor cycle that group 2 of row 1 sends its two instructions to storage cells 221 and 222 for transmission to the execution units, state machine 202 sends another two instructions to the empty group 1 storage cells. Thus, we observe a "ping-pong" effect wherein 1) during a first processor cycle, two row 1 group 1 instructions transfer to storage cells 221 and 222 for transfer to the execution units; 2) during a second processor cycle, two row 1 group 2 instructions transfer to cells 221 and 222 for execution, and 3) during a third processor cycle, two row 1 group 1 instructions again transfer to cells 221 and 222 for execution, etc. Thus, the topology of issue queue 204 provides optimal instruction throughput for instructions with no dependencies. Stated another way, when row 1 receives a supply of instructions with no dependencies these instructions issue immediately to the lowermost cells of side queue 215 from which they transfer to the appropriate execution units for execution. In other words, group 1 fills and then group 1 issues as group 2 fills; as group 1 refills group 2 issues; as group 2 refills group 1 issues, and so on and so forth.

A series of examples below explains the operation of issue queue 204 under different operating conditions. In one example, issue control state machine 202 inserts 2 valid instructions in group 1 of row R1 during one processor cycle. These instructions are ready-to-issue. In other words, these instructions exhibit no reason why they cannot issue immediately to the execution units. A reason that may prevent immediate execution of an instruction in an out-of-order (OOO) issue queue is that the instruction exhibits dependencies on the results of other instructions. In other words, needed operands required by the instruction are not presently available. However, since in the present example, group 1 of row 1 includes two valid instructions with no dependencies, row 1 supplies these two In the above discussed example, the issue queue 204 both receives two instructions and issues two instructions in the same processor cycle to provide perfect throughput. In other words, issue queue 204 does not impede instruction issue when decoder 140 provides issue stage 200 and issue queue 204 with a series of decoded instruction with no dependencies via dependency checker 155. The example discussed above assumes that issue queue 204 is empty when it starts to receive a series of instructions without dependencies. In this scenario, issue queue 204 achieves 100% throughput with no idle time to wait for any dependencies to resolve.

In the following example the bottom row, namely row 1, fills with four instructions that exhibit dependencies. All four storage cells 212 or entries in row R1 are now valid because instructions occupy these storage cells. However, since instructions that exhibit dependencies now populate the entire row R1, no instructions from row R1 may presently issue to an execution unit for execution. In other words, the group 1 and group 2 instructions in row R1 exhibit dependencies and may not issue until these dependencies resolve. Since row R1 may not presently issue to execution units via storage units 221 and 222, row R1 stalls and the rows above row R1 start to fill with instructions from decoder 140.

Assuming that row R2 populates with group 3 and group 4 instructions which exhibit no dependencies and that row R1 can not issue because it exhibits dependencies, row R2 effectively bypasses row 1 by transferring or issuing to side queue 215. By convention, instructions closer to the left side of a row exhibit higher priority than instructions closer to the right side of a row. Thus, if all 4 instructions in row R2 exhibit no dependencies, then the group 3 instructions issue to side queue 215 under the control of issue control state machine 202. More particularly, the leftmost instruction in group 3 transfers to storage unit 231 and the remaining instruction in group 3 transfers to storage unit 232. Note that each side queue storage cell pair 221-222, 231-232, 241-242, and 251-252 couples to, and can receive instructions from, a respective row R1, row R2, row R3 and row R4. In this embodiment, two instructions may transfer to the side queue 215 per processor cycle. In subsequent processor cycles the group 3 instructions issue to appropriate execution units via storage cells 221 and 222 of side queue 215 provided the instructions in row R1 still exhibit dependencies. In this manner, instructions without dependencies issued to higher storage cell pairs in side queue 215 transfer downward toward storage cell pair 221-222 which ultimately issues the instruction pair to the appropriate executions units for execution. Thus, even though row R1 includes instructions with dependencies, row R2 bypasses the stalled row R1 by issuing via side queue 215.

In a similar manner, if row R1 and row R2 completely fill with dependent instructions which are not ready-to-issue, instructions in row R3 without dependencies may issue by flowing through side queue storage cell pairs 241-242, 231-232 and 221-222 to appropriate execution units. In one embodiment, it takes one processor cycle for two instructions to flow toward the execution units from storage cell pair to storage cell pair in side queue 215. Moreover, if row R1, row R2 and row R3 completely fill with dependent instructions which may not immediately issue, instructions in row R4 without dependencies may issue by flowing through side queue storage cell pairs 251-252, 241-242, 231-232 and 221-222 to appropriate execution units.

In another operational scenario, assume that rows R1, R2, R3 and R4 completely fill with instructions exhibiting dependencies. In this scenario, main issue queue array 210 includes no ready-to-issue instructions in one processor cycle. However, in the next processor cycle, the dependencies of the group 1 instructions in row R1 resolve. In response to such resolution, the now ready-to-issue group 1 instructions transfer or flow to side queue storage cells 221 and 222. Assume that the group 3 instructions now resolve. In the subsequent processor cycle, the group 1 instructions in storage cells 221 and 222 issue to the appropriate execution units and the group 3 instructions from row R2 flow into the unoccupied storage cells in row R1 left by the group 1 instructions that previously moved to side queue 215. In this manner, instructions in a higher row flow down to or trickle down to openings in lower rows left by instructions moving to the side queue. This trickle down action applies to row R3 and row R4 as well.

If issue control state machine 202 has a choice of moving an instruction from an upper row either to an opening in a lower row of main issue queue array 210 or moving that instruction to side queue 215, state machine 202 moves the instruction to a lower row in main issue queue array 210.

The issue queue 204 shown in FIG. 2 is a recursive structure for design efficiency reasons. By recursive we mean that the row R1 structure and its associated storage cell pair 221-222 repeats 3 times upwardly to form the complete issue queue 204 topology depicted in FIG. 2. In other words, row R2 and the associated storage cell pair 231-232 are structurally a repetition of row R1 and storage cell pair 221-222. Similarly, row R3 and its storage call pair 241-242, and row R4 and its storage cell pair 251-252 again repeat the structure of row R1 and its storage cell pair 221-222. Using this recursive topology, issue queue 204 may include more or fewer rows and associated side queue storage cell pairs as desired for a particular application.

In another scenario, row R1 fills completely with instructions not ready-to-issue. For example, the group 1 and group 2 instructions all exhibit dependencies and thus row R1 stalls. However, row R2 includes a group 3 with ready-to-issue instructions. Issue control state machine 202 places the ready-to-issue group 3 instructions in storage cells 231 and 232 of side queue 215 during one processor cycle. In the next processor cycle, the dependencies in row R1 all resolve. Thus, all 4 instructions in row R1, namely the group 1 instructions and the group 2 instructions, are ready-to-issue. Moreover, the storage cells 231 and 232 include the two ready-to-issue instructions from group 3 of row R2. Thus, six instructions are now ready-to-issue, namely 4 in row R1 and 2 in the side queue storage cells 231-232.

Since row R1 populates with instructions before row R2, row R1 by definition contains instructions older than the group 3 instructions now in side queue storage cells 231-232. Issue control state machine 202 now makes a 6 way decision regarding which two instructions of these six instructions may issue via bottom storage cells 221-222. As discussed below in more detail, issue control state machine 202 associates an age bit with each instruction in issue queue 204. In this manner, issue control state machine 202 monitors the age of each instruction in issue queue 204 relative to the age of other instructions in issue queue 204. By convention, the leftmost instructions in any row of main issue queue array 210 are older than the rightmost instructions of such row. Thus, in row R1, the group 1 instructions exhibit a greater age than the group 2 instructions. Issue control state machine 202 accords these instructions exhibiting a greater age a greater priority when considering which instructions to issue to the execution units. Thus, of the six ready-to-issue instructions, issue control state machine 202 sends the group 1 instructions of row R1 to side queue storage cells 221-222 for issuance to the execution units coupled thereto. The group 2 instructions of row R1 exhibit a greater age than the group 3 instructions now stored in side queue storage cells 231-232. Hence, issue control state machine 202 sends the group 2 instructions to side queue storage cells 221-222 for issuance to the execution units in the next processor cycle. Issue control state machine 202 monitors the age bits associated with the group 3 instructions now in side queue storage cells 231-232 and determines that these instructions exhibit a greater age than more recent group 3 or group 4 instructions that flow or trickle down to row 1. Thus, issue control state machine 202 sends the group 3 instructions in storage cells 231-232 to bottom side queue storage cells 221-222 for issuance to the execution units before the newly populated row R1 instructions issue.

If issue control state machine 202 finds that an instruction in main issue queue array 210 is not ready-to-issue, then issue control state machine 202 may send that instruction to a lower row in array 210 that includes an opening or unoccupied storage cell. This action represents a vertical compression. Stated alternatively, issue control state machine 202 may compress or transfer not ready-to-issue instruction from higher rows to lower rows in issue queue array 210 provided such lower rows contain an opening or unoccupied cell. However, in this embodiment, issue control state machine 202 may not issue a not ready-to-issue instruction to side queue 215 or to an execution unit. In one embodiment, main issue queue array 210 may also compress ready-to-issue instructions in the manner described above.

In another embodiment, issue control state machine 202 includes several state machines to control issue queue 204 of issue stage 200. More specifically, as seen in FIG. 3, issue control state machine 202 includes a priority state machine 400 for instruction age control, an insertion control state machine 500, a bottom row issue control state machine 600, an upper rows compression and side issue state machine 700 and a ready state machine 800. These state machines work together and cooperate to improve the throughput of issue queue 204.

Figure 4A:
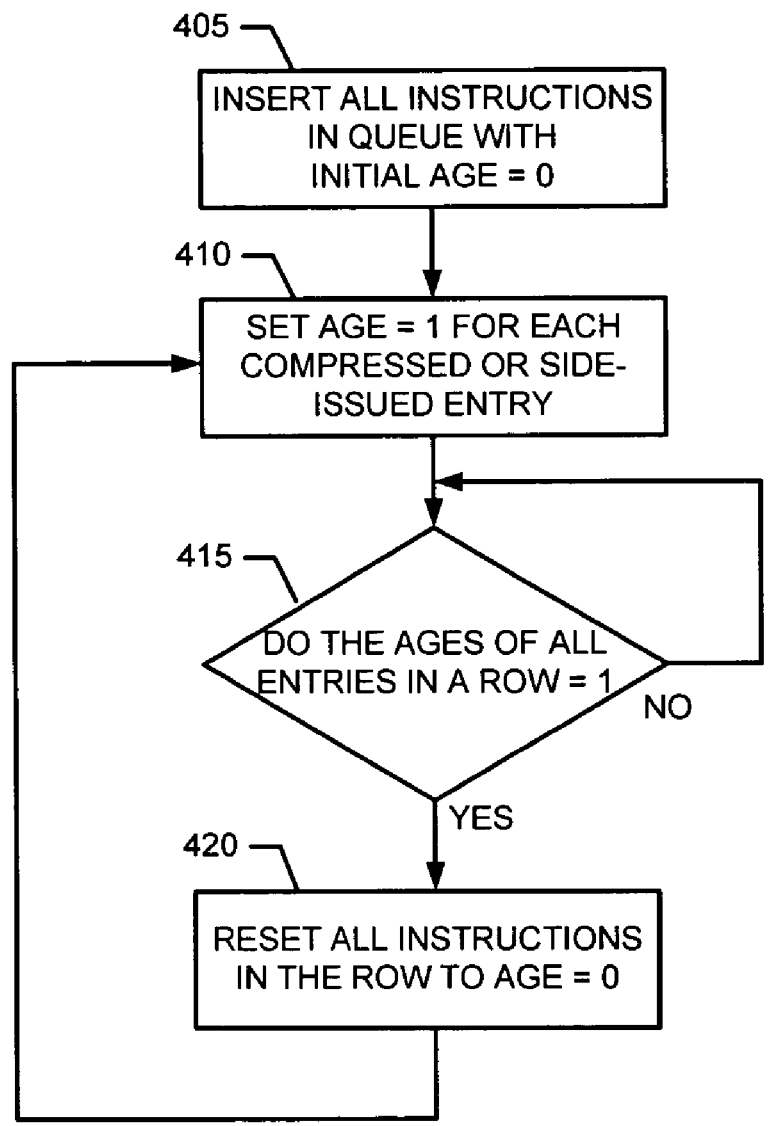
FIG. 4A is a flow chart that depicts process flow in a priority state machine of the disclosed processor.

FIG. 4A shows a flowchart depicting the operation of a priority state machine 400 that manages the age of instructions in issue queue 204. Age refers to the program order of instructions in a software program as determined by a software compiler (not shown). A non-volatile storage device (not shown) couples to processor 100 to store the compiled software program. The software compiler determines the program order of the software program that processor 100 ultimately executes. With respect to instruction age, processor 100 defines a first instruction that the software compiler sets to execute before a second instruction as an older instruction. Similarly, with respect to instruction age, processor 100 defines a third instruction that the software compiler sets to execute after a fourth instruction as a younger instruction. In one embodiment, processor 100 gives priority to older instructions over younger instructions in issue queue 204. This approach tends to increase the performance and reduce complexity of issue queue 204.

FIG. 4B shows issue queue 204 populated with instructions from decoder 140. Issue control state machine 202 determines which instructions go to which storage cells 212 or instruction locations in issue queue 204. As seen in FIG. 4B, each storage cell that stores an instruction also stores an age bit. An age bit of 0 indicates an older instruction whereas an age bit of 1 indicates a younger instruction on a row by row basis. Issue control state machine 202 configures the instructions stored in the storage cells of issue queue 204 such that columns become younger as you proceed from left to right. In other words, by this convention, the leftmost column of issue queue 204 stores the oldest instruction of a particular row and the rightmost column stores the youngest instruction of that particular row. Other embodiments may reverse this convention if desired.

As mentioned above, an instruction from an upper row may compress or flow down to an open storage cell in a lower row. When priority state machine 400 sets an age bit to 1 (younger), this indicates within a particular row that the particular instruction compressed from the row above. Therefore, that particular compressed instruction exhibits an age younger than all of the other non-compressed instructions or entries in that particular row. Again, with respect to a particular row, of all instructions in that row exhibiting a ready-to-issue status, the older instructions receive priority over younger instructions with respect to further compression to a lower row or issuance to side queue 215. Among instructions in a particular row with the same age bit, priority state machine 400 gives higher priority from left to right.

Returning to the flowchart of FIG. 4A, when issue control state machine 202 first inserts each instruction into an open storage cell in a row of main issue queue array 210, priority state machine 400 sets the age bit of such initially inserted instruction to zero, as per block 405. However, when an instruction compresses or flows from an upper row to an opening in a storage cell in a lower row, priority state machine 400 sets the age bit of that compressed instruction to 1, as per block 410. This distinguishes the newly compressed instruction from other older instructions present in the same row in which the compressed instruction arrives. Also as per block 410, when an instruction flows or transfers from a row in main issue queue array 210 to a side queue storage cell of a storage cell pair corresponding to that row, priority state machine 400 sets the age bit of that instruction to 1. At block 415, priority state machine 400 conducts a test to determine if all instructions in a particular row exhibit an age bit=1. If not, priority state machine 400 continues to conduct a test until all instructions in the particular row exhibit an age bit=1. Once priority state machine 400 determines that all instructions stored in a particular row exhibit an age bit=1, state machine 400 resets the age bit=0 for all instructions in that row, as per block 420. Process flow then continues back to block 410 which sets the age bit=1 for each compressed or a side-issued instruction in a particular row.

Returning to populated issue queue 204 of FIG. 4B, this example illustrates the operation of the age bit stored with each instruction in the storage cells of issue queue 204. Each of rows R1 R4 of main issue queue array 210 includes 4 instructions in respective storage cells, namely instruction INSTR 1, INSTR 2, INSTR 3 and INSTR 4. Side queue storage cells 221-222 correspond to row R1 storage cells in that side queue storage cells 221-222 couple to the R1 storage cells to receive instructions to issue to the execution units. FIG. 4B labels the storage cells 221-222 as ISSUE INST since each of these cells can store the next instruction to issue to the execution units. Side queue storage cells 231-232 correspond to row R2 storage cells in that side queue storage cells 231-232 couple to the R2 storage cells to receive instructions to forward to the execution units. FIG. 4B labels the storage cells 231-232 as INSTR 5 and INSTR 6 since each of these cells can receive an instruction from row R2 or side queue storage cells 241-242 above. Side queue storage cells 241-242 correspond to row R3 storage cells in that side queue storage cells 241-242 couple to the R3 storage cells to receive instructions to forward to the execution units. FIG. 4B labels the storage cells 241-242 as INSTR 5 and INSTR 6 since each of these cells can receive an instruction from row R3 or side queue storage cells 251-252 above. Side queue storage cells 251-252 correspond to row R4 storage cells in that side queue storage cells 251-252 couple to the R4 storage cells to receive instructions to forward to the execution units. FIG. 4B labels the storage cells 251-252 as INST5 and INSTR6 since each of these cells can receive an instruction from row R4.

Referring now to instructions INSTR 1-INSTR 4 in row R1, the issue priority is INSTR 1, INSTR3, INSTR 4 which all exhibit an age=0. INSTR 1 issues first via storage cell pair 221-222 due to INSTR 1's position as the leftmost instruction in row R1. Moving from left to right in row R1, INSTR 3 issues next followed by INSTR 4. Now any remaining instruction in row R1 with age=1 issues and thus INSTR 2 issues via storage cell pair 221-222. Subsequent to the issuance of row R1 instructions as discussed above, the instructions INSTR 5 and INSTR 6 issue via side queue storage cell pair 221-222. Instructions INSTR 5 and INSTR 6 from storage cell pair 231-232 each exhibit an age bit=1. Since main issue queue array instructions in a particular row issue before side queue instructions received from a row above the particular row, issuance of instructions INSTR 5 and INSTR 6 in storage cell pair 231-232 via storage cell pair 221-222 follows issuance of first row R1 instructions INSTR 1, INSTR 3, INSTR 4 and INSTR 2.

Referring now to instructions INSTR 1-INSTR 4 in row R2, all instructions in this row exhibit an age=1. Moreover, instructions INSTR 5-INSTR 6 in the adjacent side queue storage cell pair 241-242 each exhibit an age=1 as well. Thus, as per decision block 415 and reset block 420 of the flowchart of FIG. 4A, all age bits reset to age=0 in the processor cycle following decision block 415's detecting of this condition.

Referring now to the instructions in row R3 and adjacent side queue storage cells 251-252, instruction INSTR 2 in row R3 compressed or flowed down to row R3 from R4. Thus, instruction INSTR 2 in row R3 exhibits the younger age bit=1. Instructions INSTR 5 and INSTR 6 in side queue storage cells 251-252 issued to storage cells 251-252 from row R4 above. Thus, instructions INSTR 5 and INSTR 6 in side queue storage cells 251-252 exhibit the younger age bit=1. When rows R1-R3 fill with instructions, issue control state machine 202 starts to fill row R4 with fetched decoded instructions. Issue control states machine 202 fills row R4 with instructions exhibiting an age bit=0 with priority from left to right.

Figure 5:
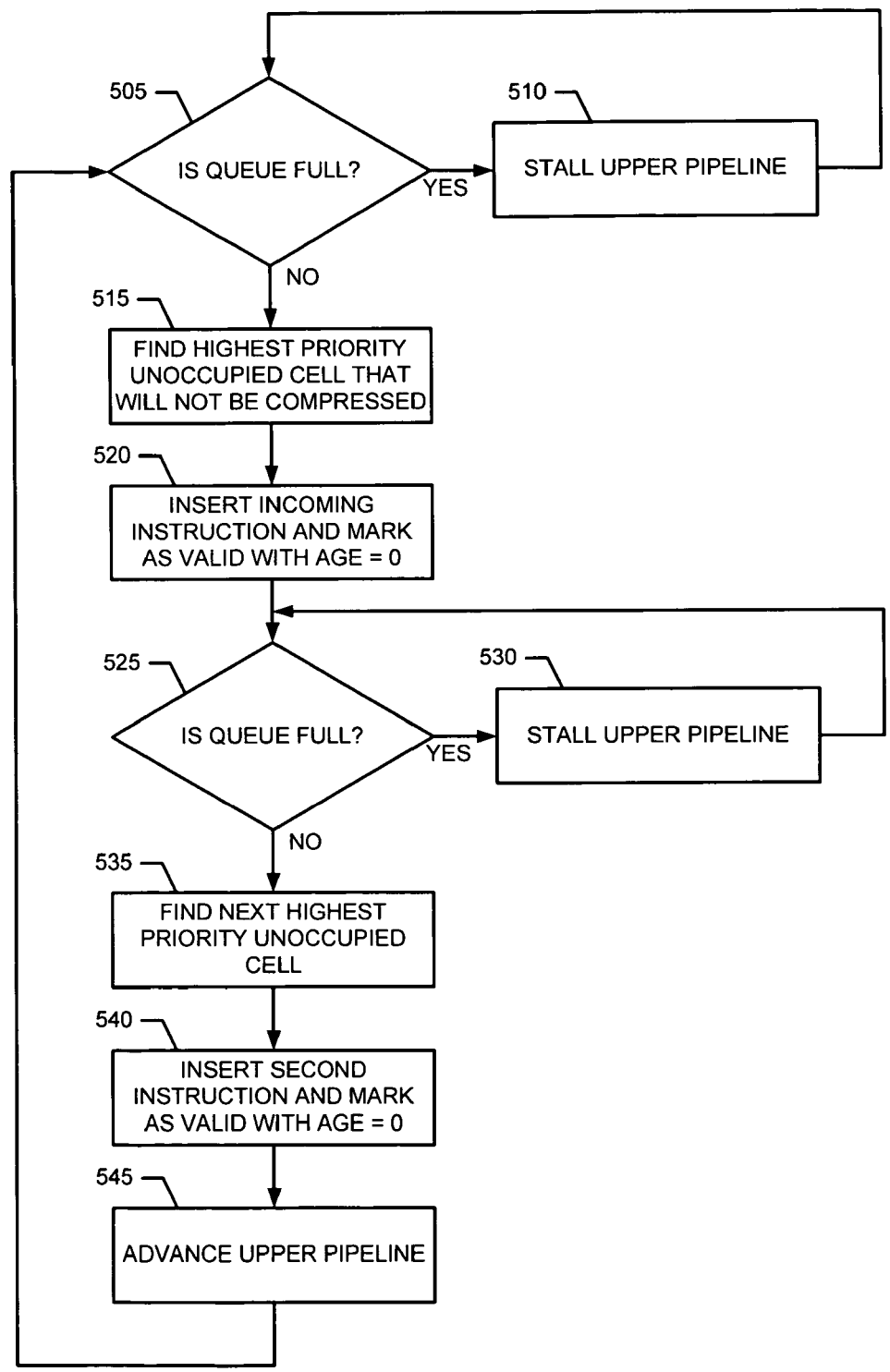
FIG. 5 is a flow chart that depicts process flow in an insertion control state machine of the disclosed processor.

FIG. 5 shows a flowchart depicting process flow in insertion control state machine 500. Insertion control state machine 500 cooperates with the other state machines in issue control state machine 202 to control the insertion of instructions, also called entries, in the storage cells of issue queue 204. At decision block 505, issue control state machine 500 conducts a test to determine if issue queue 204 is full. If issue queue 204 is full, the upper pipeline stalls as per block 510. The upper pipeline includes dispatch unit 135, microcode unit 150, MUX 145, decoder 140, and dependency checker 155. Decision block 505 continues to test until an unoccupied storage cell appears in issue queue 204, thus making issue queue 204 no longer full. Issue queue 204 may include multiple unoccupied storage cells. Insertion control state machine 500 finds the highest priority storage cell that is currently not compressible. A storage cell entry or instruction may not be compressible if the row below that instruction is full. As per block 520, insertion control state machine 500 inserts the incoming instruction into the highest priority unoccupied storage cell found in block 515. Insertion control state machine 500 marks the instruction thus stored as valid with an age bit=0. State machine 500 then conducts another test at decision block 525 to determine if the issue queue 204 is once again full. If the state machine 500 finds that issue queue 204 is full, then the upper pipeline stalls as per block 530. Testing continues at decision block 525 until issue queue 204 again contains at least one unoccupied storage cell. In that event, process flow continues to block 535 at which state machine 500 determines the next highest priority unoccupied cell in issue queue 204. In one embodiment, the insertion control state machine 500 inserts instructions into the storage cells in the main issue queue array 210. In another embodiment, insertion control state machine 500 may insert an instruction into the highest priority side queue storage cell if the instruction is ready-to-issue. As per block 540, state machine 500 then inserts the next incoming instruction into the next highest priority unoccupied cell found in block 535. After completing this task, the upper pipeline advances as per block 545 and process flow continues back to decision block of 505 which again tests issue queue 204 to determine if the queue 204 is full.

Figure 6:
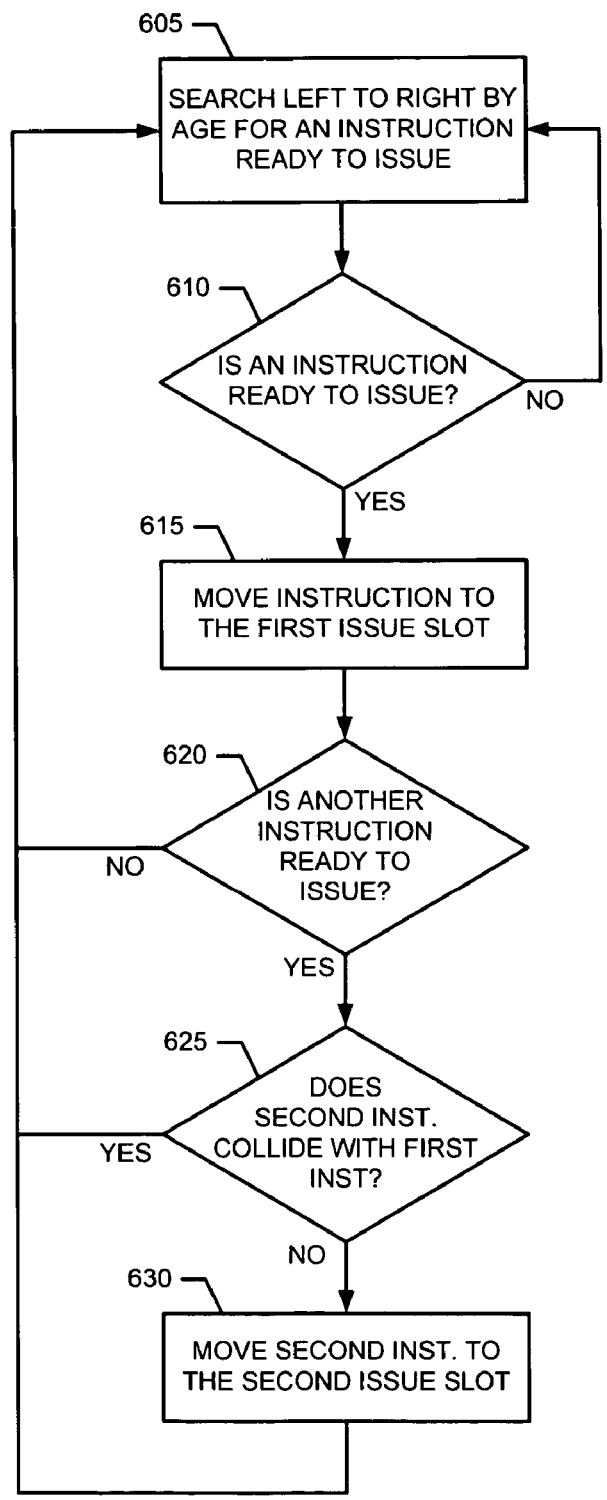
FIG. 6 is a flow chart that depicts process flow in a bottom row issue control state machine of the disclosed processor.

FIG. 6 shows a flowchart depicting process flow in bottom row issue control state machine 600 that controls the issuance of instructions from bottom row R1 of main issue queue array 210. State machine 600 cooperates with ready state machine 800 to determine if an instruction in bottom row R1 is ready-to-issue. State machine 600 searches left to right by age through the bottom row R1 of main issue queue array 210 as per block 605. Decision block 610 tests the instructions in bottom row R1 to determine if any of these instructions are ready-to-issue. If decision block 610 finds that a particular bottom row instruction is not ready-to-issue, then searching continues as per block 605 until decision block 610 finds an instruction that is ready-to-issue. If decision block 610 finds no ready-to-issue instructions after searching all bottom row instructions, then state machine 600 waits one processor cycle and searching commences again at block 605. However, once decision block 610 finds a ready-to-issue in the bottom row R1, state machine 600 moves that instruction to one of the two issue storage cells 221-222, namely a first issue slot, as per block 615. Issue storage cells 221-222 may also be called issue slots. These storage cells or slots couple to, and issue instructions to, the execution units that ultimately execute the issued instructions. Decision block 620 performs a test to determine if a second instruction in the bottom row R1 is ready-to-issue. If decision block 620 fails to find such a second instruction ready-to-issue, then process flow continues back to block 605 for additional searching. However, if decision block 620 finds such a second instruction ready-to-issue, then decision block 625 conducts a test to determine if this second instruction collides with the prior first construction. A collision means that the second ready-to-issue instruction requires the same execution unit as the first ready-to-issue instruction and therefore such a second ready-to-issue instruction may not issue in the same processor cycle as the first ready-to-issue instruction. If decision block 625 finds such a collision, then process flow continues back to block 605 for more searching in bottom row R1. However, if decision block 625 finds no such collision, then state machine 600 moves the second instruction to the second issue slot, namely storage cell 222, as per block 630. Process flow then continues back to block 605 which conducts additional searching in bottom row R1 for instructions ready-to-issue. In one embodiment, compression, insertion and age updates occur before issue decisions 610 and 620.

Figure 7:
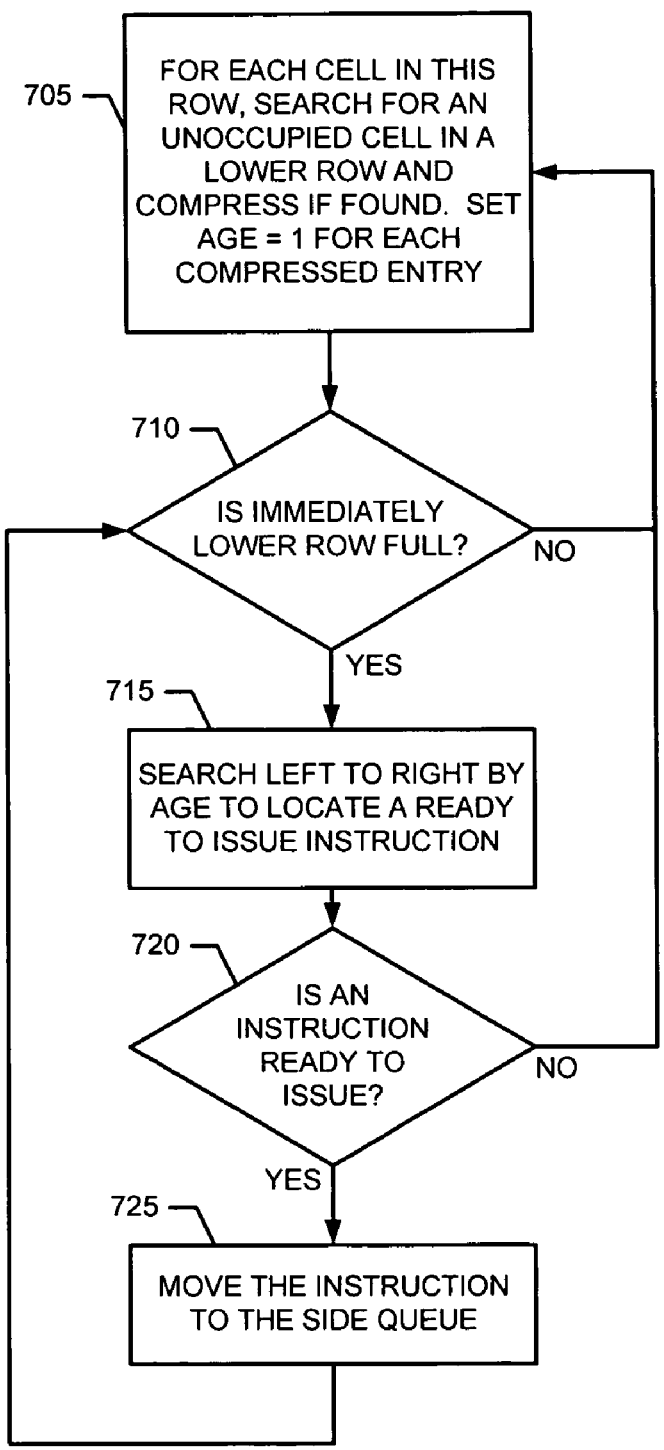
FIG. 7 is a flow chart that depicts process flow in an upper rows compression and side issue state machine of the disclosed processor.

FIG. 7 shows a flowchart depicting process flow in the upper rows compression and side issue state machine 700. Upper rows include those rows in main issue queue array 210 other than row R1. For each instruction or entry in a particular upper row, state machine 700 searches for an unoccupied cell in the immediately lower row. If state machine 700 finds such an unoccupied cell in the immediately lower row, state machine 700 instructs main instruction queue array 210 to compress the entry located above into that unoccupied cell, as per block 705. State machine 700 also sets all entries thus compressed to age bit=1, namely younger, as per block 705. State machine 700 then performs a test at decision block 710 to determine if this lower row is full. If this lower row is not full, then process flow continues back to block 705 for additional compression if possible. However, if decision block 710 finds that this lower row is full, then state machine 700 searches all rows in parallel from right to left by age to locate a ready-to-issue instruction, as per block 715. In other words, state machine 700 conducts the same search simultaneously on all rows. If this search finds no such ready-to-issue instruction, then decision block 720 sends process flow back to block 705 for compression activities if possible. However, if the search finds a ready-to-issue instruction, then decision block 720 sends process flow to block 725. Block 725 moves the ready-to-issue instruction to side queue 215 from which it issues later. Issue control state machine 202 performs insertion into issue queue 204 and instruction age bit updates before the above described compression and issue decisions.

Figure 8:
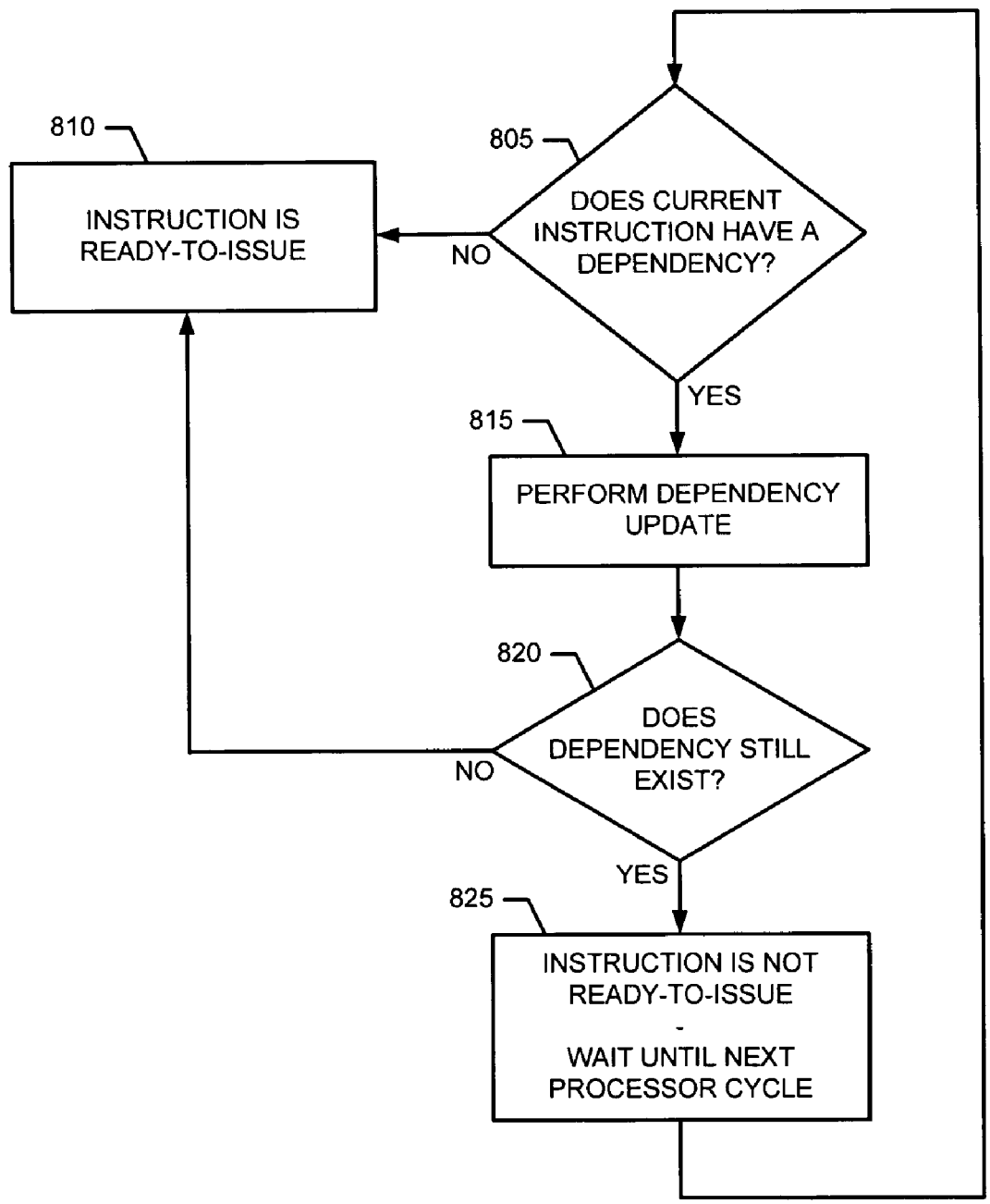
FIG. 8 is a flow chart that depicts process flow in a ready state machine of the disclosed processor.

FIG. 8 shows a flowchart depicting the process flow of ready state machine 800 that determines if a particular instruction is ready-to-issue. First, ready state machine 800 checks the current instruction to determine if that instruction exhibits a dependency, as per block 805. If decision block

805 determines that the current instruction exhibits no dependencies, then state machine 800 designates the current instruction as ready-to-issue, as per block 810. However, if state machine 800 determines that the current instruction exhibits a dependency, then state machine 800 performs a dependency update, as per block 815. Decision block 820 then conducts a test to determine if the dependency still exists. If the dependency no longer exists, then state machine 800 designates the instruction as ready-to-issue, as per block 810. However, if the dependency still exists, then state machine 800 designates the instruction as not ready-to-issue, as per block 825. After waiting for one processor cycle, state machine 800 sends process flow back to decision block 805 for additional dependency testing.

Figure 9:
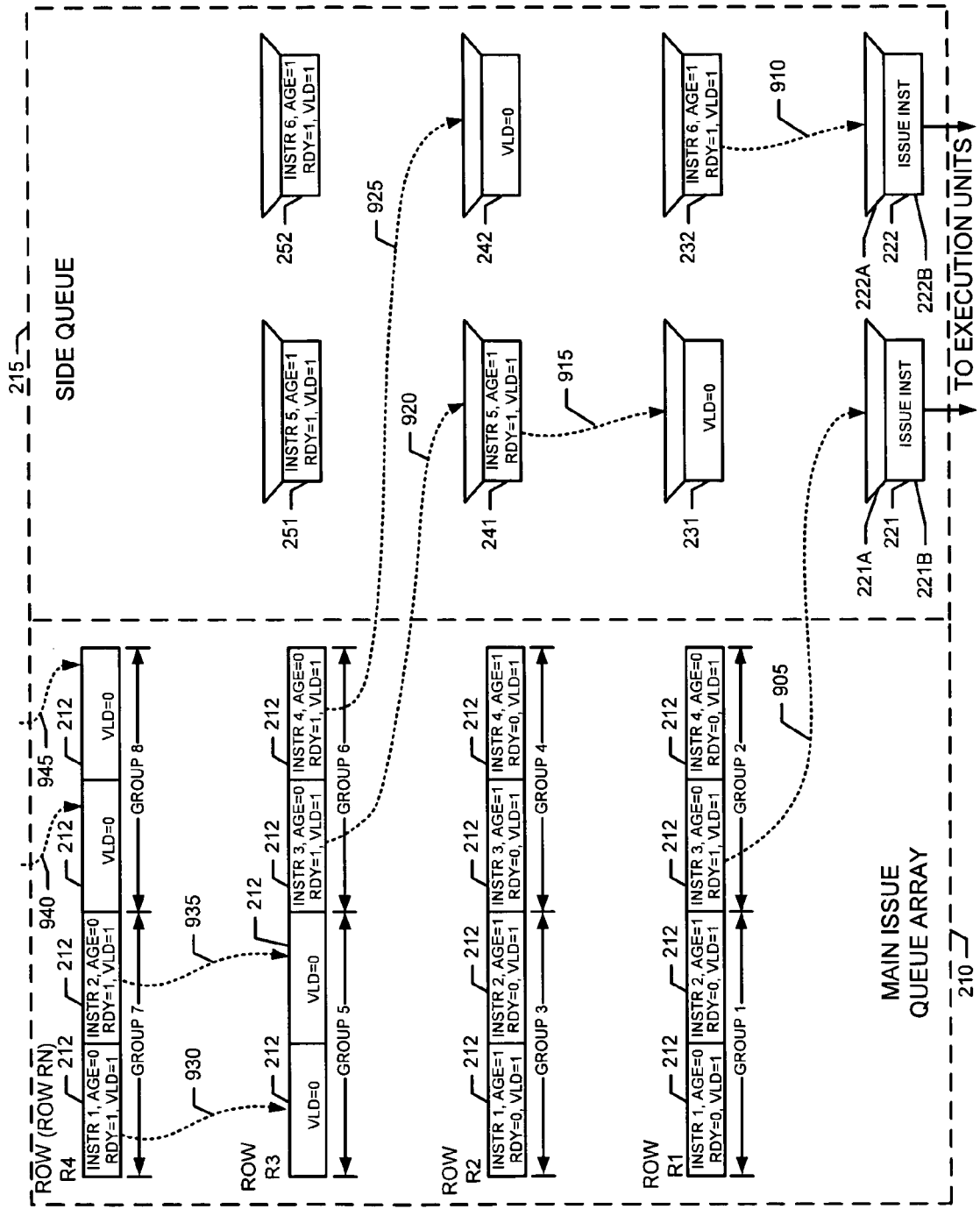
FIG. 9 is a block diagram of the issue queue of the disclosed processor marked to show instruction insertion, compression and issue.

FIG. 9 shows a simplified representation of issue queue 204 with the connections between main issue queue 210 and side issue queue 215 removed for clarity. This issue queue representation provides examples of instruction insertion in the queue, compression within the queue and issue from the queue. Note that row R4 associates with side queue storage cell pair 251-252. Row R3 associates with side queue storage cell pair 241-242. Row R2 associates with side queue storage cell pair 231-232. The bottom row of main issue queue array 210 associates with issue instruction storage cell pair 221-222. When issue control state machine 202 places instructions in storage cell pair 221-222, such instructions proceed or issue directly to the execution units that execute those instructions. FIG. 9 designates all storage cells unoccupied by an instruction as VLD=0, namely meaning invalid/no instruction present in this cell. Storage cells containing an instruction include, for example as seen in the leftmost instruction of row R1, an instruction number INSTR, an age bit AGE, a ready-to-issue bit RDY, and an instruction valid bit VLD. An instruction is ready-to-issue when its RDY bit=1.

The following discusses representative instructions within issue queue 204 to illustrate the operation of the queue. Instruction INSTR 3 of row R1 exhibits a ready bit RDY=1 and is thus ready-to-issue. Since INSTR 3 also exhibits an age bit=0, it exhibits the highest priority in row R1 as the oldest ready-to-issue instruction in row R1. Thus, as dashed line 905 indicates, INSTR 3 flows to storage cell 221 from which it issues to an appropriate execution unit. The remaining instructions in row 1 all exhibit a ready bit RDY=0 indicating that they are not yet ready-to-issue. Thus, these remaining instructions stall in row R1. Instruction INSTR 6 in side queue storage cell 232 exhibits a ready bit RDY=1 and is thus ready-to-issue. Since this INSTR 6 does not collide with the instruction now in storage cell 221, as dashed line 910 indicates, the INSTR 6 transfers to storage cell 222 from which it issues. INSTR 6 in side queue storage cell 232 exhibits a ready bit RDY=1 and is thus In row R2 of main issue queue array 210, all instructions exhibit RDY=0 thus indicating lack of readiness to issue. Since INSTR 1, INSTR 2, INSTR 3 and INSTR 4 in row R2 are not ready issue, these storage cells remain occupied, thus preventing any instructions from the row above, namely row R3, from compressing into row R2. In side queue 215, INSTR 5 in storage cell 241 exhibits RDY=1 and is thus ready-to-issue. Since the cell 231 below cell 241 is unoccupied (VLD=0), instruction INSTR 5 from storage cell 241 compresses or flows into storage cell 231 as indicated by dashed line 915.

Now referring to row R3 of main issue queue array 210, the first two leftmost storage cells in row R3 remain unoccupied since VLD=0 for each of these cells. However, instructions INSTR 3 and INSTR 4 occupy the two rightmost cells of row R3. Each of these two instructions exhibit a ready bit RDY=1 and are thus ready-to-issue. However, since 4 instructions in row R2 block the row R3 instructions from compressing into row R2, the INSTR 3 and INSTR 4 instructions of row R3 instead issue into storage cells 241 and 242 of side queue 215, as indicated by dashed lines 920 and 925, respectively. Since instructions now occupy both side queue storage cells 241 and 242, the ready-to-issue instructions INSTR 5 and INSTR 6 in side queue storage cells 251 and 252 stall and thus do not immediately flow into storage cells 241 and 242.

Now referring to the uppermost row R4 of main issue queue array 210, instructions INSTR 1 and INSTR 2 each exhibit a RDY bit=1. Thus, each of these instructions is ready-to-issue. Since row R3 includes two unoccupied storage cells wherein VLD=0, the ready-to-issue instructions INSTR 1 and INSTR 2 from row 4 compress or flow into the two unoccupied storage cells in row R3 as indicated by dashed lines 930 and 935. Issue control state machine 202 inserts the next two instructions that issue queue 204 receives into the two unoccupied storage cells in row R4 wherein VLD=0 as indicated by dashed lines 940 and 945.

Figure 10:
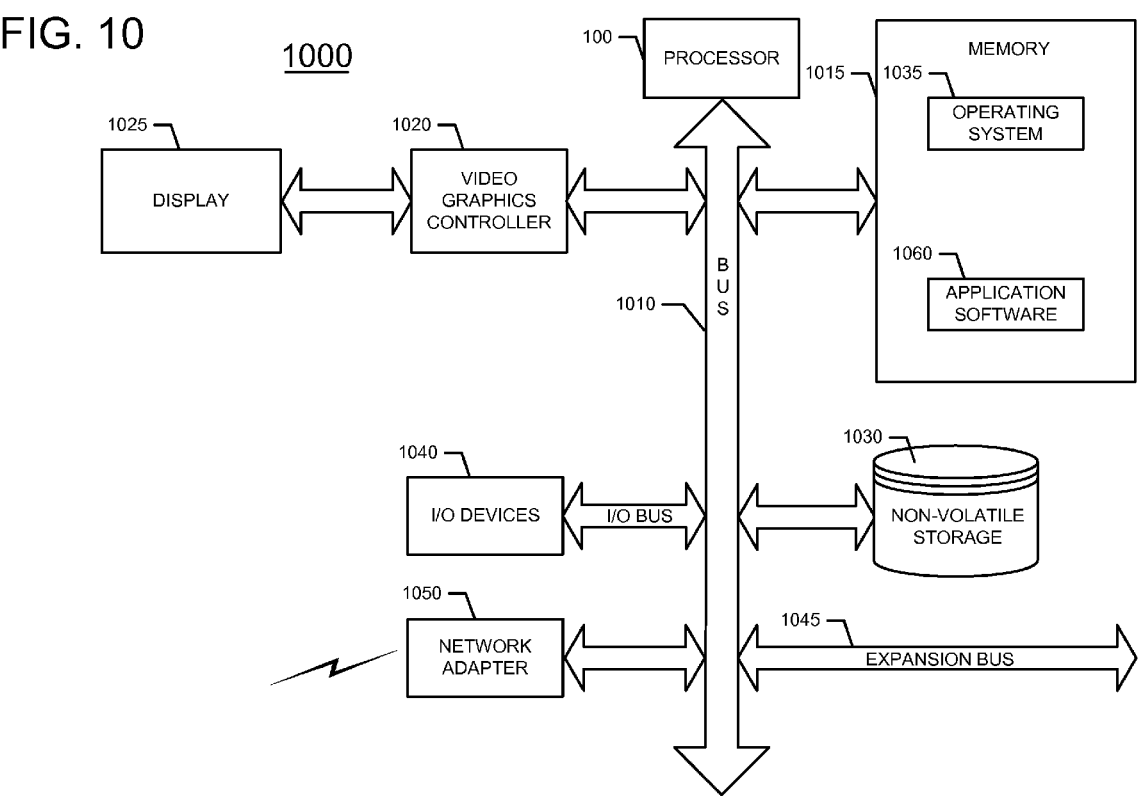
FIG. 10 is a block diagram of an information handling system employing the disclosed processor.

FIG. 10 shows an information handling system (IHS) 1000 that includes processor 100. IHS 1000 further includes a bus 1010 that couples processor 100 to system memory 1015 and video graphics controller 1020. A display 1025 couples to video graphics controller 1020. Nonvolatile storage 1030, such as a hard disk drive, CD drive, DVD drive, or other nonvolatile storage couples to bus 1010 to provide IHS 1000 with permanent storage of information. An operating system 1035 loads in memory 1015 to govern the operation of IHS 1000. Memory 1015 stores application software 1060 as well. I/O devices 1040, such as a keyboard and a mouse pointing device, couple to bus 1010. One or more expansion busses 1045, such as USB, IEEE 1394 bus, ATA, SATA, PCI, PCIE and other busses, may couple to bus 1010 to facilitate the connection of peripherals and devices to IHS 1000. A network adapter 1050 couples to bus 1010 to enable IHS 1000 to connect by wire or wirelessly to a network and other information handling systems. While FIG. 10 shows one IHS that employs processor 100, the IHS may take many forms. For example, IHS 1000 may take the form of a desktop, server, portable, laptop, notebook, or other form factor computer or data processing system. IHS 1000 may also take other from factors such as a personal digital assistant (PDA), a gaming device, a portable telephone device, a communication device or other devices that include a processor and memory.

The foregoing discloses a processor that may provide improved throughput in a processor issue queue.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a processor comprising:
fetching instructions from a memory, by an instruction fetcher, thus providing fetched instructions;
decoding the fetched instructions, by a decoder, the decoder providing decoded instructions to an issue queue that includes a main queue array of storage cells arranged in rows and columns and a side queue array of storage cells arranged in rows and columns, the side queue array including an issue row that issues instructions from the main queue array or the side queue array for out-of-order execution by executions units, each row of the side queue array being capable of receiving instructions from a respective row of the main queue array to enable bypassing of instructions in the main issue queue array in the event of a stall in the main issue queue array;
storing, by the main queue array, the decoded instructions in the rows and columns of the main queue array for out-of-order issuance to execution units by the issue row of the side queue array;
determining, by the issue queue, if the main queue array is stalled by a first instruction that is not ready-to-issue in one of the rows of the main queue array, the issue queue searching other rows of the main queue to locate a second instruction that is ready-to-issue out-of-order with respect to the stalled first instruction
bypassing the stalled first instruction in a particular row of the main queue array by the issue queue forwarding the second instruction in another row of the main queue array to a respective corresponding row of the side queue array for later issuance by the issue row of the side queue array to an execution unit for out-of-order execution while the stalled first instruction remains in the main queue array;
wherein the storage cell rows of the main queue array are recursively configured red with respect to one another, and wherein the storage cell rows of the side queue array are recursively configured with respect to one another.

2. The method of claim 1, wherein each row of the main queue array communicates with a corresponding respective row of the side queue array, one row of the side queue array being the issue row that receives instructions ready for execution from a first row of the main queue array or from an adjacent row of the side queue array above the issue row of the side queue array, such that each row of the main queue array above the first row of the main queue array may forward an instruction to a corresponding respective row of the side queue array when that instruction cannot advance to a next lower row in the main queue array due to a dependency exhibited by an instruction in the next lower row, and wherein the issue row of the side queue array provides ready-to-issue instructions to the execution units.

3. The method of claim 2, further comprising advancing, by the issue queue, an instruction in a second row of the main queue array to an execution unit by first transferring the instruction in the second row of the main queue array to the first row of the main queue array when an unoccupied storage cell appears in the first row of the main queue array, and subsequently transferring the instruction from the first row of the main queue array to the issue row of the side queue array from which the issue queue transfers the instruction to the execution unit.

4. The method of claim 3, wherein the storing step further comprises storing, by the main queue array, age information for each instruction in the main queue array, the age information denoting the age of a particular instruction relative to other instructions in the row of the main queue array in which an instruction is stored.

5. The method of claim 4, wherein an instruction that advances to the first row of the main queue array from the second row of the main queue array exhibits an age older than another instruction in the second row of the main queue array.

6. The method of claim 4, wherein instructions closer to one end of the second row of the main queue array receive a higher priority with respect to advancing to the first row of the main queue array than other instructions in the second row of the main queue array.

7. The method of claim 1, wherein the determining step further comprises checking each instruction in the main queue array for a dependency to determine if each instruction in the main queue array is ready-to-issue or not ready-to-issue.

8. A processor comprising:
a fetch stage adapted to fetch instructions from a memory to provide fetched instructions;
a decoder, coupled to the fetch stage, that decodes the fetched instructions to provide decoded instructions;
a plurality of execution units; and
an issue queue, coupled between the decoder and the plurality of execution units, including a main queue array of storage cells arranged in rows and columns, the issue queue also including a side queue array of storage cells arranged in rows and columns, the side queue array including an issue row that issues instructions from the main queue array or the side queue array for out-of-order execution by the execution units, each row of the side queue array being capable of receiving instructions from a respective row of the main queue array to enable bypassing of instructions in the main issue queue array in the event of a stall in the main issue queue array, the main queue array storing the decoded instructions for out-of-order issuance to the execution units by the issue row of the side queue array, wherein the issue queue determines if the main queue array is stalled by a first instruction that is not ready-to-issue in one of the rows of the main queue array, the issue queue searching other rows of the main queue to locate a second instruction that is ready-to-issue out-of-order with respect to the stalled first instruction in a particular row of the main queue array by forward the second instruction in another row of the main queue array to a respective corresponding row of the side queue array for later issuance by the issue row of the side queue array to an execution unit for out-of order execution while the stalled first instruction remains in the main queue array, the storage cell rows of the main queue array being recursively configured with respect to one another, the storage cell rows of the side queue array being recursively configured with respect to one another.

9. The processor of claim 8, wherein each row of the main queue array communicates with a corresponding respective row of the side queue array, one row of the side queue array being the issue row that receives instructions ready for execution from a first row of the main queue array or from an adjacent row of the side queue array above the issue row of the side queue array, such that each row of the main queue array above the first row of the main queue array may forward an instruction to a corresponding respective row of the side queue array when that instruction cannot advance to a next lower row in the main queue array due to a dependency exhibited by an instruction in the next lower row, and wherein the issue row of the side queue array provides, ready-to-issue instructions to the execution units.

10. The processor of claim 9, wherein the issue queue advances an instruction in a second row of the main queue array to an execution unit by first transferring the instruction in the second row of the main queue array to the first row of the main queue array when an unoccupied storage cell appears in the first row of the main queue array, and wherein the issue queue subsequently transfers the instruction from the first row of the main queue array to the issue row of the side queue array from which the issue queue transfers the instruction to the execution unit.

11. The processor of claim 10, wherein the main queue array stores age information for each instruction in the main queue array, the age information denoting the age of a particular instruction relative to other instructions in the row of the main queue array in which an instruction is stored.

12. The processor of claim 11, wherein an instruction that advances to the first row of the main queue array from the second row of the main queue array exhibits an age older than another instruction in the second row of the main queue array.

13. The processor of claim 8, further comprising a dependency checker, coupled to the issue queue, that checks each decoded instruction in the main queue array for dependencies to determine if each decoded instruction in the main queue array is ready-to-issue.

14. An information handling system (IHS) comprising:
a processor including:
  a fetch stage adapted to fetch instructions from a memory to provide fetched instructions;
  a decoder, coupled to the fetch stage, that decodes the fetched instructions to provide decoded instructions;
  a plurality of execution units;
  an issue queue, coupled between the decoder and the plurality of execution units, including a main queue array of storage cells arranged in, the issue queue also including a side queue array of storage cells arranged in rows and columns, each row of the side queue array being capable of receiving instructions from a respective row of the main queue array to enable bypassing of instructions in the main issue queue array in the event the event of a stall in the main issue queue array, the main queue array storing the decoded instructions for out-of-order issuance to the execution units by the issue row of the side queue array, wherein the issue queue determines if the main queue array is stalled by a first instruction that is not ready-to-issue in one of the rows of the main queue array, the issue queue searching other rows of the main queue to locate a second instruction that is ready-to-issue out-of-order with respect to the stalled first instruction queue basses the stalled first instruction in a particular row of the main queue array by forwarding the second instruction in another row of the main queue array to a respective corresponding row of the side queue array for later issuance by the issue row of the side queue array to an execution unit for out-of order execution while the stalled first instruction remains in the main queue array, the storage cell rows of the main queue array being recursively configured with respect to one another, the storage cell rows of the side queue array being recursively configured with respect to one another; and
a memory coupled to the processor.

15. The IHS of claim 14, wherein each row of the main queue array communicates with a corresponding respective row of the side queue array, one row of the side queue array being the issue row that receives instructions ready for execution from a first row of the main queue array or from an adjacent row of the side queue array above the issue row of the side queue array, such that each row of the main queue array above the first row of the main queue array may forward an instruction to a corresponding respective row of the side queue array when that instruction cannot advance to a next lower row in the main queue array due to a dependency exhibited by an instruction in the next lower row, and wherein the issue row of the side queue array provides, ready-to-issue instructions to the execution units.

16. The IHS of claim 14, wherein the issue queue advances an instruction in a second row of the main queue array to an execution unit by first transferring the instruction in the second row of the main queue array to the first row of the main queue array when an unoccupied storage cell appears in the first row of the main queue array, and wherein the issue queue subsequently transfers the instruction from the first row of the main queue array to the issue row of the side queue array from which the issue queue transfers the instruction to the execution unit.

17. The IHS of claim 16, wherein the main queue array stores age information for each instruction in the main queue, the age information denoting the age of a particular instruction relative to other instructions in the row of the main queue array in which an instruction is stored.

* * * * *